United States Patent [19]
Syria

[11] 3,776,044
[45] Dec. 4, 1973

[54] ELECTRONIC ACCELEROMETER SYSTEM

[75] Inventor: Ronald L. Syria, Utica, Mich.

[73] Assignee: Borg-Warner Corporation, Chicago, Ill.

[22] Filed: Jan. 6, 1972

[21] Appl. No.: 215,862

[52] U.S. Cl. .......................................... 73/516 LM
[51] Int. Cl. ............................................. G01p 15/12
[58] Field of Search .................. 73/516 LM, 516 R, 73/517 R, 517 B, 503; 33/366

[56] References Cited
UNITED STATES PATENTS

| | | | |
|---|---|---|---|
| 2,713,726 | 7/1955 | Dixson | 73/516 LM UX |
| 2,662,956 | 12/1953 | Bareford | 73/516 LM X |
| 3,164,023 | 1/1965 | Holderer | 73/516 LM |
| 3,442,023 | 5/1969 | Remington et al. | 33/366 |

Primary Examiner—James J. Gill
Attorney—William S. McCurry et al.

[57] ABSTRACT

To measure acceleration of a vehicle or other moving unit, a system installed in the vehicle includes an electrolytic gravity sensor coupled with at least one other component in a voltage divider arrangement. An a-c signal generator develops a signal across the voltage divider arrangement, so that the gravity sensor provides a signal which varies as a function of vehicle acceleration. This varying signal is rectified, integrated and utilized as an analog voltage signal representing the actual deceleration. The system includes a further stage for providing a variable resistance or analog current signal output. A polarity reversal protector is coupled to the input stage so that the electronic components of the system will not be damaged by connection to vehicle batteries of different polarity arrangements.

9 Claims, 3 Drawing Figures

ELECTRONIC ACCELEROMETER SYSTEM

BACKGROUND OF THE INVENTION

As more electronic equipment is added to automotive vehicles to regulate functions such as fuel injection, timing of the ignition spark, control of braking arrangements, and so forth, a corresponding need has developed for accurate information to regulate these various systems. When controlled braking is utilized to prevent "lock-up" of a wheel to reduce the total stopping distance and minimize skidding in a panic stop, it is requisite that a signal be provided indicating when the vehicle is decelerating in excess of a predetermined rate. As used in this specification and in the appended claims, "acceleration" is used to embrace both positive and negative accelerations, that is, what is normally called acceleration and deceleration of a body. Some attempts to provide such a signal have included a pendulum-like member mounted to be displaced and contact a ring to close an electrical circuit indicating that the acceleration has reached a predetermined level, which level can be adjusted by a spring bearing against the pendulum member. Another device to provide such a signal includes a series of electrical contacts embedded in the wall of a switch into which mercury or other conducting fluid is sealed. As acceleration increases, the mercury is displaced to an increasing height against a wall ramp, and completes circuits through successive sets of contacts to provide step function signals indicating vehicle acceleration. However there has still remained a need for an accurate and simple arrangement for providing a precise analog output signal indicating vehicle deceleration, a need which has not yet been effectively answered.

As different systems have been developed for installation in automotive vehicles, some problems have been encountered because different vehicles utilize different polarity battery or electrical systems. In some the negative pole of the battery may be connected to vehicle ground, and in others the positive pole of the battery is connected to the ground. A system provided for installation in a car and connection to its normal electrical system might be damaged or destroyed through inadvertent energization with a voltage of the opposite polarity than that usually found in such vehicles. Thus another important need for the many electronic installations in today's cars is for a polarity reversal protection unit at the input side of the electronic system, to protect against inadvertent application of reverse polarity voltages.

SUMMARY OF THE INVENTION

An electronic acceleration sensing system constructed in accordance with this invention for installation in a vehicle includes an electrolytic gravity sensor unit. An impedance is coupled with this gravity sensor unit in a voltage divider arrangement. Means, such as an a-c signal generator, is provided for applying an a-c voltage signal across the voltage divider arrangement. Thus the signal developed across the gravity sensor varies as a function of vehicle acceleration changes. Means, such as a capacitor, is connected to integrate the signal from the gravity sensor to provide an analog voltage signal indicating the vehicle acceleration.

In accordance with another aspect of the invention, an output stage can be coupled to the integrator stage to provide an optional output signal which varies as an analog current or as a variable resistance. This is useful for different types of circuits which may require different analog inputs depending upon the particular circuitry employed.

Yet another optional addition to the invention is a polarity reversal protector, coupled between the vehicle battery and the input circuit for energizing the system, to protect the electronic components against damage by inadvertent reversal of the polarity of the voltage supplied for energizing the system.

THE DRAWING

In the several figures of the drawing, like reference numerals identify like components, and in the drawing.

GENERAL SYSTEM DESCRIPTION

Figure 1:
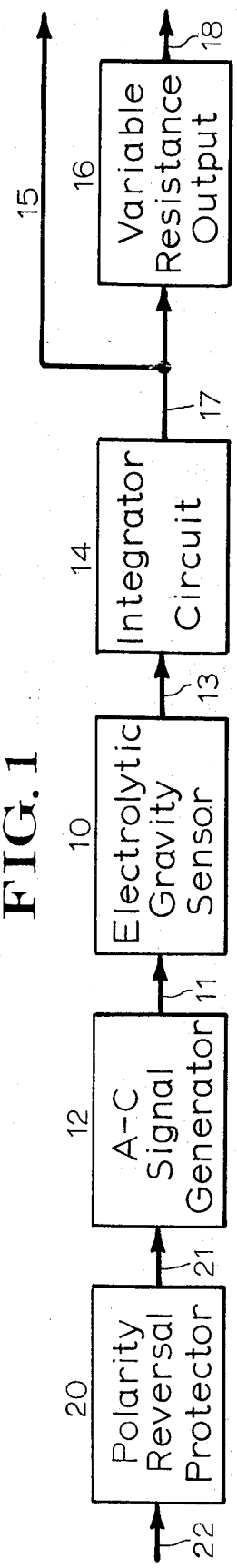
FIG. 1 is a block diagram of the basic components of the electronic accelerometer system, and also of optional components which can be added.

FIG. 1 depicts a general arrangement of an electronic system in which an electrolytic gravity sensor 10 is coupled over line 11 to an a-c signal generator 12. The signal generator can be multivibrator or any other conventional arrangement for providing an a-c voltage. Changes of acceleration of the vehicle in which the system is installed provide changes in the signal passed from sensor 10 over line 13 to integrator circuit 14. In turn the integrated signal passed over line 15 is an analog voltage signal for use in an anti-skid system or other unit in the vehicle.

For some electronic components, an analog voltage signal is desired. Other components may require an indication such as an analog current. In accordance with one aspect of this invention, a variable resistance output stage 16 is connected to receive the voltage-varying signal over line 17 from integrator circuit 14, and to provide on output line 18 a signal which has its current level varying as a function of the vehicle acceleration. In this sense the output stage 16 can be considered a variable resistance stage, in that its effective resistance is varied as a function of the analog voltage signal on line 17, thus to provide an analog current signal on line 18.

In accordance with another optional aspect of the invention, a polarity reversal protector stage 20 may be connected to provide d-c energization over reference line 21 for the a-c signal generator unit 12. In this regard the protector circuit 20 itself receives d-c input energy over d-c input line 22 from the vehicle battery, or any other suitable source of unidirectional potential. Those skilled in this art know that sometimes a battery is connected with a positive ground for the system in the automotive unit, although most electrical systems in the United States cars at this time have a negative ground arrangement. Protector stage 20 provides the appropriate polarity of energization over reference line 21, irrespective of whether a positive or negative ground system is utilized in the d-c energy supplied over d-c input line 22. With this general perspective of the invention as a whole, and the alternate stages 16 and 20, a more detailed description will now be set out in connection with FIG. 2.

DETAILED DESCRIPTION OF THE INVENTION

As there shown, a d-c voltage is supplied over d-c input conductors 22a and 22b to the opposite input connections of a rectifier bridge 20, which accomplishes the polarity reversal protection function. Bridge 20 includes four diodes 25, 26, 27, 28 connected in a conventional rectifier arrangement. In addition the ground symbol 30 indicates that the input conductor 22b is also coupled to chassis ground, that is, the common circuit reference for the stages 10–16 shown in the remainder of FIG. 2. When the input voltage on line 22a is positive relative to the instantaneous voltage on conductor 22b, current flows over line 22a, diode 25, reference conductor 21a, the circuit components in signal generator stage 12, reference conductor 21b, diode 28, and line 22b back to the battery or other source. With the opposite polarity of the energy supplied over lines 22a and 22b, current flow is over line 22b, diode 26, line 21a, circuit 12, line 21b, and diode 27 back to conductor 22a. Thus the polarity reversal protector 20 accomplishes its function notwithstanding the actual polarity of the energy supplied from the vehicle battery or other source over d-c input lines 22a, 22b. This is a significant aspect of the invention in that it facilitates the installation of an electronic system such as 10–18 shown in FIG. 2 in any vehicle, without necessitating a reversal of any component to accommodate vehicles which for some reason may have a different electrical system than that generally used in this country. It is also emphasized that any electronic system, such as fuel injection, automatic braking, or other unit, may be protected by the unit 20, although in the instant arrangement the electronic acceleration system is depicted.

The a-c signal generator stage 12 illustrated is basically an astable multivibrator circuit comprising a pair of NPN type transistors 31, 32, coupling capacitors 33, 34, and resistors 35–38. The interconnection and operation of such a circuit is not well known and understood in this art. For purposes of simplifying construction and operation, a table of suitable component values will be set out at the end of this specification. For the present it is sufficient to note that upon the application of the d-c voltage between reference conductors 21a and 21b, and a-c output signal is developed between the common conductor 21b and the common connection of resistor 38 with the collector of transistor 32.

Figure 3:
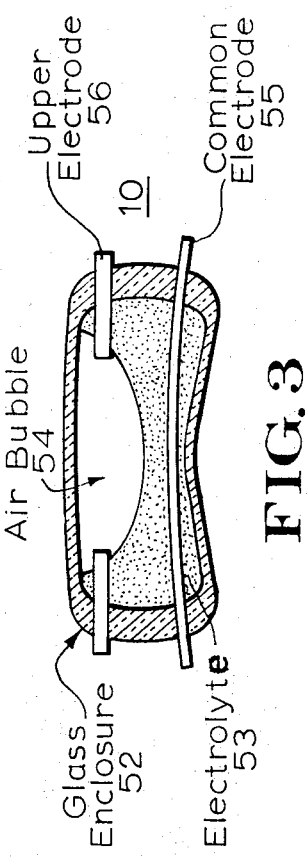
FIG. 3 is a sectional view of one type of electrolytic gravity sensor suitable for use in the system of this invention.

This a-c output signal is passed through coupling capacitor 40 to the voltage divider circuit, which includes an impedance 41 and electrolytic gravity sensor 10. The common connection of these components is referenced as terminal 42. Although shown as a reistor, of course other impedances could be substituted for the unit 41 so long as the basic voltage divider arrangement is maintained. A more complete description of one suitable electrolytic unit 10 will be set out below in connection with FIG. 3. For the present it is only important to note that with vehicle acceleration changes, there is a related change of the effective impedance of unit 10, thus providing an a-c signal on line 13 which varies as a function of vehicle acceleration.

This varying a-c signal is rectified by diode 43 and applied to the integrator circuit 14, which includes a series-coupled variable resistor 44 and a parallel-coupled capacitor 45. Integration of this signal provides an analog voltage output signal on line 15 which varies as a function of acceleration changes of the vehicle in which the system including components 10, 12, and 14 is mounted.

For some purposes it is desirable to have another output signal in which the current is the parameter which varies as a function of vehicle acceleration. To this end a variable resistance output stage 16 can be incorporated as shown. In stage 16 an NPN type transistor 46 has its emitter coupled through a resistor 47 to conductor 21b, and its collector coupled to output conductor 18. Of course in addition to providing the variable current level signal over this conductor, transistor 46 is also energized over this path. The base of transistor 46 is coupled through resistor 48 to conductor 17, and a variable resistor 50 is coupled in parallel with capacitor 45. It is thus apparent that transistor 46 has its effective impedance varied with changes in the potential on line 17 relative to the potential on conductor 21b, producing a variable current signal on conductor 18. It is again noted that this is an option, and may not be required when the voltage-varying signal on line 15 is adequate.

Figure 2:
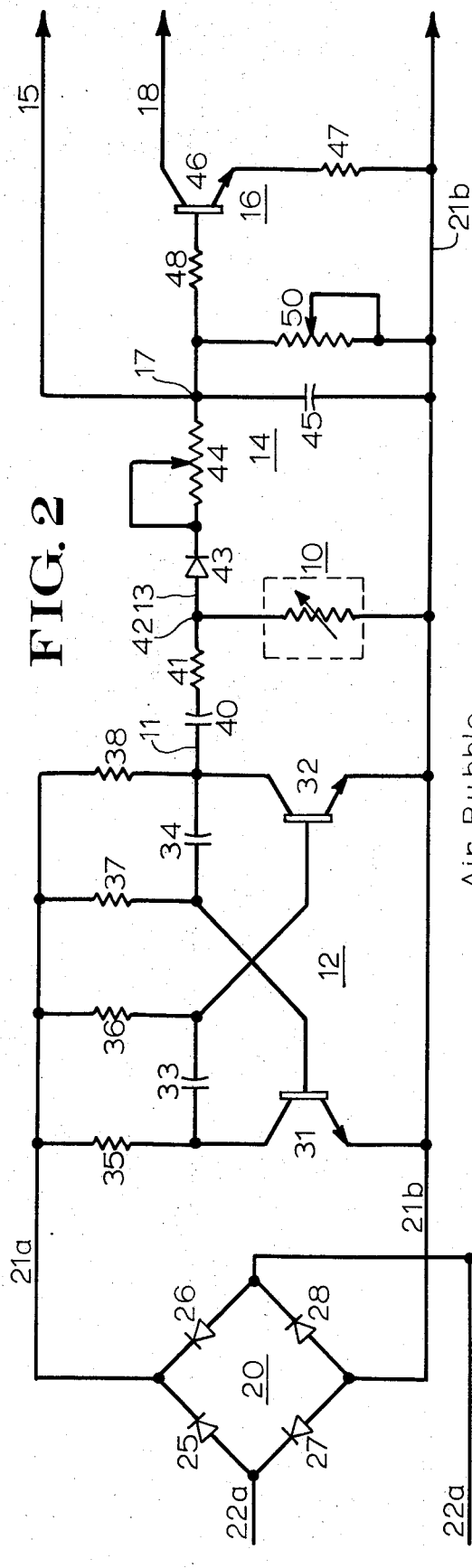
FIG. 2 is a schematic diagram depicting circuit details of the components shown generally in FIG. 1.

A significant aspect of this invention is the analytical consideration of known electronic accelerometer systems to focus upon their differences, and the recognition that an electrolytic gravity sensor could be employed as shown in FIG. 2 to substantially enhance the accuracy of such systems and provide a smooth analog signal (or signals) indicating the acceleration changes. One such sensor 10 is shown generally in FIG. 3. The unit includes a glass enclosure 52 in which an electrolyte substance 53 is contained, with an air bubble 54 in the upper portion of the enclosure. The lower or common electrode 55 extends through the main body of the electrolyte, and the extremities of electrode 55 protrude outwardly of enclosure 52 to provide for connection with the circuit components. An upper ring type electrode 56 contacts a portion of the electrolyte fluid and likewise extends outwardly of enclosure 52 for connection to the circuit elements. Such units have been developed to sense gravity or tilt, but in the present invention it is recognized that they may be advantageously incorporated in a system such as shown in FIG. 2 to provide the analog indication of an acceleration change. Such sensors are commercially available at the present time, for example, from Hamlin Electronics, Inc., in Lake Mills, Wis.

Solely to enable those skilled in the art to make and use the invention with a minimum of experimentation, a table of circuit components found suitable for operating the system is set out below. For this operation a voltage of 5 volts positive on line 21a with respect to that on line 21b was used, with multivibrator 12 operating at a frequency of approximately 1,000 hertz. It is noted that an a-c system is desirable in that application of d-c current through the electrolyte in transducer 10 would cause breakdown of the electrolyte if applied continuously.

| COMPONENT | IDENTIFICATION OR VALUE |
|---|---|
| 31, 32 | 2N5172 |
| 46 | 2N5131 |
| 43 | 1N4148 |
| 33, 34 | 0.056 µf. |
| 40 | 0.33 µf. |
| 45 | 5.0 µf. |
| 35, 38 | 330 ohms |
| 36, 37 | 10 K ohms |
| 41 | 1 K ohms |
| 44 | 25 K ohms |

| | |
|---|---|
| 47 | 33 K ohms |
| 48 | 470 K ohms |
| 50 | 500 K ohms |

SUMMARY

The system of this invention mounted in a vehicle effectively damps the high amplitude transients generally associated with wheeled vehicles. It appears this damping is attributed at least in part to the inherent damping of the electrolytic fluid mass in the gravity sensor and thus this is an important component of the inventive system.

Additional damping can be added, if desired, by adding components in the integrator circuit.

It is also important that the provision of analog signals on the output conductors permits the control of the other electronic circuitry in the vehicle in smaller increments of operation that could be obtained with a digital type sensor unit. Because the only moving part is the electrolyte fluid which has a long life, the system will itself have a long life when operated at the voltage levels indicated and in the normal vehicle environment.

While only a particular embodiment of the invention has been described and illustrated, it is manifest that various modifications and alterations may be made therein. It is therefore the intention in the appended claims to cover all such modifications and alterations as may fall within the true spirit and scope of the invention.

What is claimed is:

1. An electronic accelerometer system comprising:
   an electrolytic gravity sensor unit, of the type having an electrolyte substance, an enclosure containing both the electrolyte substance and an air bubble, a common electrode extending through the main body of the electrolyte substance, and an additional electrode contacting a portion of the electrolyte substance, such that an acceleration signal can be obtained from the common and additional electrodes when the sensor unit is subjected to a change of velocity with respect to time,
   an impedance coupled with said gravity sensor in a voltage divider arrangement,
   means for providing an a-c voltage signal and applying it across the voltage divider arrangement, to provide an output signal across the gravity sensor which is a function of acceleration changes,
   rectifier means, coupled to the electrolytic gravity sensor, for rectifying the signal developed across the electrolytic gravity sensor, and
   means, coupled to the rectifier means, for integrating the acceleration signal to provide an analog voltage signal indicating the acceleration of the vehicle in which the system is installed.

2. A system as claimed in claim 1, and further comprising an output stage, coupled to the means for integrating the acceleration signal, including a variable impedance unit having a control connection for receiving the analog voltage signal to vary its impedance, thus varying the current flow through the output stage and providing an analog current signal.

3. A system as claimed in claim 1, and further comprising a polarity reversal protector stage, coupled between d-c input conductors and the means for providing an a-c voltage signal, to provide d-c energization of given polarity to the means for providing the a-c voltage signal no matter the polarity of the d-c voltage applied between the d-c input conductors.

4. An electronic acceleration sensing system, comprising:
   an oscillator circuit for providing an a-c signal upon energization by d-c energy over a pair of reference conductors,
   an electrolytic gravity sensor unit, of the type having an electrolyte substance, an enclosure containing both the electrolyte substance and an air bubble, a common electrode extending through the main body of the electrolyte substance, and an additional electrode contacting a portion of the electrolyte substance, such that an acceleration signal can be obtained from the common and additional electrodes when the sensor unit is subjected to a change of velocity with respect to time,
   an impedance coupled with the electrolytic gravity sensor in a voltage divider arrangement,
   means including a capacitor for passing the a-c signal from the oscillator to the voltage divider arrangement,
   rectifier means, coupled to the electrolytic gravity sensor, for rectifying the signal developed across the electrolytic gravity sensor, and
   an integrator circuit, coupled to the rectifier means, for providing an output analog voltage signal which is a function of the acceleration of the vehicle in which the gravity sensor is installed.

5. A system as claimed in claim 4, in which the integrator circuit includes a series-coupled resistor and a parallel-coupled capacitor, so that the output analog voltage signal is developed across the capacitor.

6. A system as claimed in claim 4, and further comprising a variable resistance output stage, including a transistor having its base coupled to the integrator circuit to receive a portion of the output analog voltage signal, such that the transistor collector-emitter current flow provides an output analog current signal.

7. A system as claimed in claim 4, in which the oscillator circuit is an astable multivibrator, energized over the reference conductors, to produce the a-c signal.

8. A system as claimed in claim 7, and further comprising a polarity reversal protector stage, coupled between a pair of d-c input conductors and the reference conductors which energize the astable multivibrator, including a rectifier bridge to establish a voltage of given polarity between the reference conductors notwithstanding the polarity of the voltage applied between the d-c input conductors.

9. An electronic accelerometer system, comprising:
   a polarity reversal protector stage, connected between a pair of d-c input conductors and a pair of reference conductors for providing a voltage of given polarity between the reference conductors notwithstanding the polarity of the voltage supplied between the d-c input conductors,
   an a-c signal generator coupled between said reference conductors to provide an a-c signal when energized by a d-c voltage between the reference conductors,
   an electrolytic gravity sensor unit, of the type having an electrolyte substance, an enclosure containing both the electrolyte substance and an air bubble, a common electrode extending through the main body of the electrolyte substance, and an additional electrode contacting a portion of the electrolyte substance, such that an acceleration signal can be obtained from the common and additional electrodes when the sensor unit is subjected to a change of velocity with respect to time, and a resistor connected with the sensor unit in a voltage divider arrangement, a coupling capacitor connected to pass the a-c signal from the signal generator stage to the voltage divider arrangement, an integrator circuit including a series-connected resistor and a parallel-connected capacitor, a rectifier coupled between the electrolytic gravity sensor unit and the integrator circuit, for rectifying at least a portion of the signal developed across the electrolytic gravity sensor and supplying the rectified signal to the integrator circuit, developing across the capacitor an analog voltage signal, and a variable resistance output stage, including a transistor having its base coupled to the integrator circuit so that the transistor impedance is varied as a function of the analog voltage signal, thereby providing transistor current flow which is an analog current signal varying as the acceleration of the vehicle in which the system is installed.

* * * * *